Figure 3:
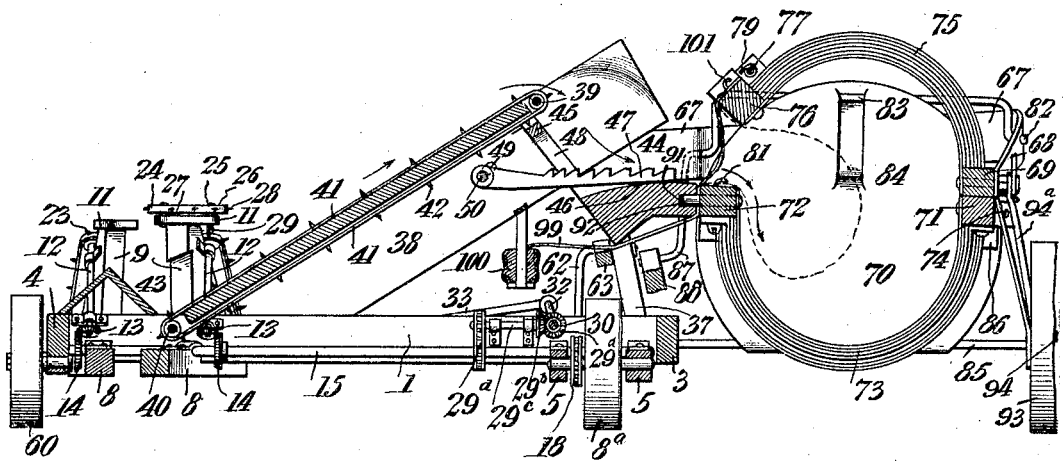

No. 770,887. PATENTED SEPT. 27, 1904.
S. A. BATES.
CORN HARVESTER AND SHOCKER.
APPLICATION FILED MAR. 30, 1904.
NO MODEL. 3 SHEETS—SHEET 1.
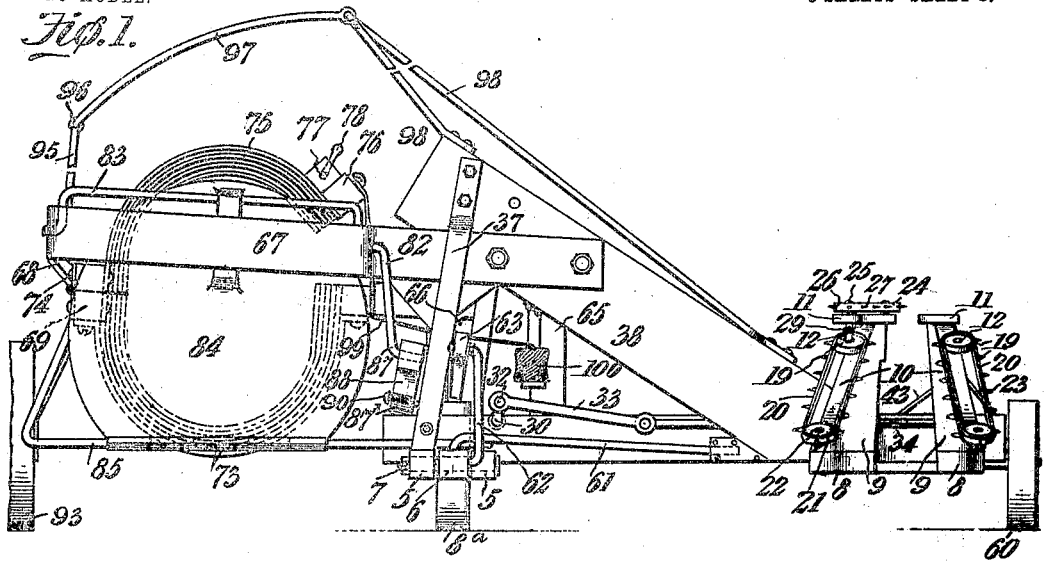
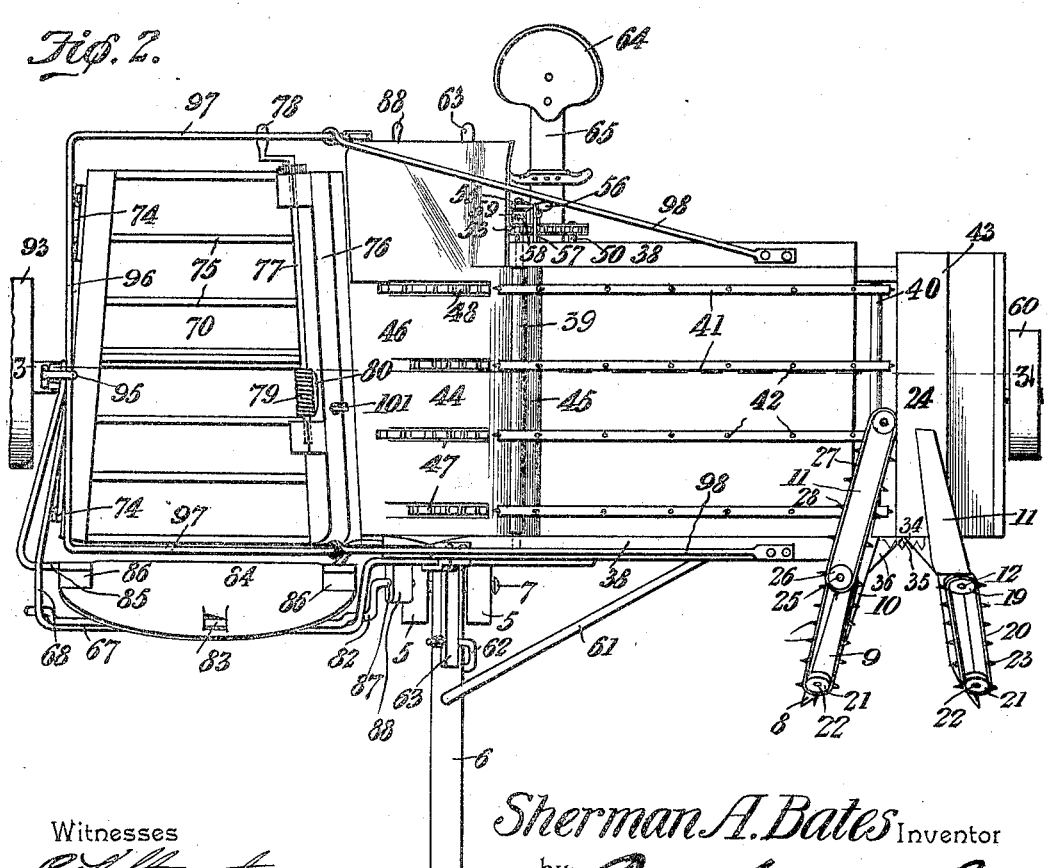
Witnesses
Sherman A. Bates, Inventor
by C. A. Snow & Co.
Attorneys No. 770,887. PATENTED SEPT. 27, 1904.
S. A. BATES.
CORN HARVESTER AND SHOCKER.
APPLICATION FILED MAR. 30, 1904.
NO MODEL. 3 SHEETS—SHEET 2.

Witnesses
E. T. Stewart
Wm. Bagger

Sherman A. Bates    Inventor
by C. A. Snow & Co.
           Attorneys

No. 770,887. PATENTED SEPT. 27, 1904.
S. A. BATES.
CORN HARVESTER AND SHOCKER.
APPLICATION FILED MAR. 30, 1904.
NO MODEL. 3 SHEETS—SHEET 3.

Witnesses

Sherman A. Bates Inventor by C. A. Snow & Co.
Attorneys

No. 770,887. Patented September 27, 1904.

UNITED STATES PATENT OFFICE.

SHERMAN A. BATES, OF COLLINS, IOWA.

CORN HARVESTER AND SHOCKER.

SPECIFICATION forming part of Letters Patent No. 770,887, dated September 27, 1904.

Application filed March 30, 1904. Serial No. 200,790. (No model.)

*To all whom it may concern:*

Be it known that I, SHERMAN A. BATES, a citizen of the United States, residing at Collins, in the county of Story and State of Iowa, have invented a new and useful Corn Harvester and Shocker, of which the following is a specification.

This invention relates to that class of corn-harvesters by means of which the cornstalks are cut and gathered, means being provided for severing the stalks, for carrying the same to a receiver, for therein compressing the stalks while the shock is being bound, and for finally depositing the shock upon the ground.

The invention has for its object to provide a machine of this class which shall possess superior advantages in point of simplicity, durability, and general efficiency; and with these and other ends in view, which will appear as the nature of the invention becomes better understood, the same consists in the improved construction, arrangement, and combination of parts, which will be hereinafter fully described, and particularly pointed out in the claims.

In the accompanying drawings has been illustrated a simple and preferred form of embodiment of my invention, with the understanding, however, that changes and modifications may be made, especially with regard to size, proportion, and exact manner of assemblage, within the scope of my invention and without departing from the spirit or sacrificing the utility of the same. Thus I desire it to be distinctly understood that while in the drawings hereto annexed a machine has been illustrated adapted to cut a single row of corn it will be no departure from the invention to extend the frame and to provide for a cutting apparatus whereby a second row of corn may be operated upon, carrying means of a nature similar to that shown in the annexed drawings being provided for the purpose of conveying the cornstalks from the outer or secondary cutting apparatus to the mechanism whereby the stalks are fed into the receiver or shocker.

Figure 4:
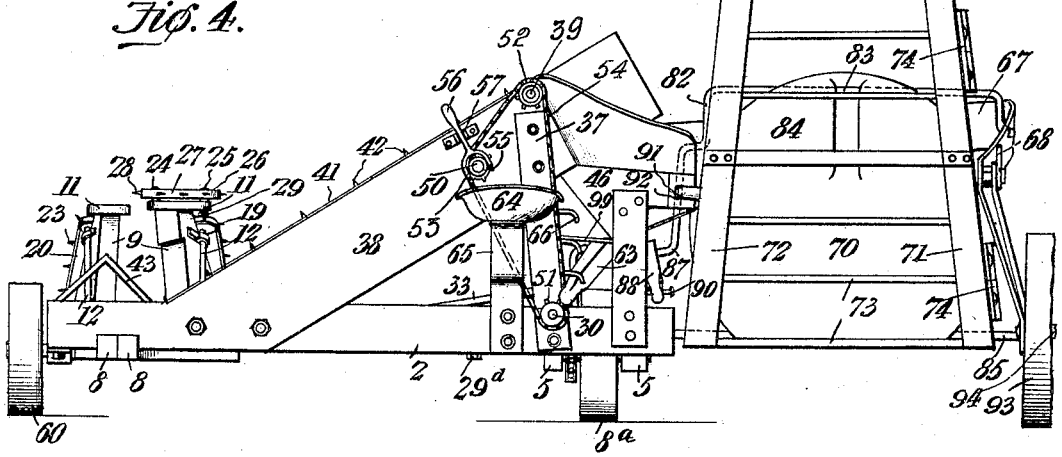
Figure 8:
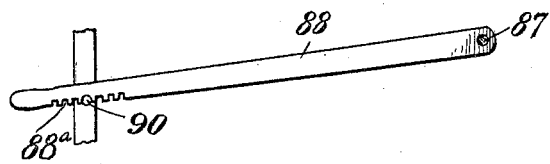
Figure 5:
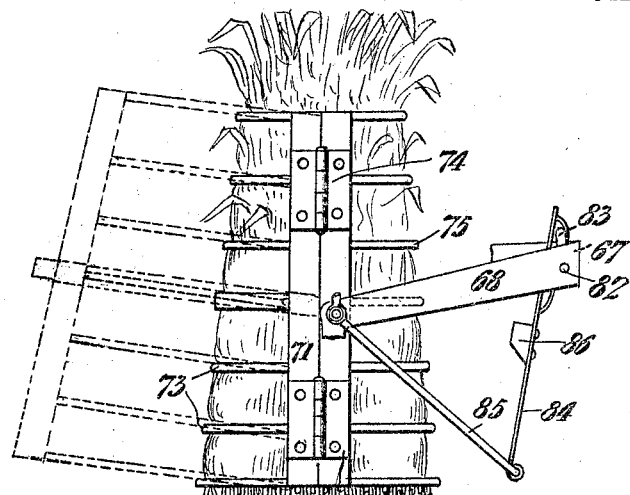
Figure 6:
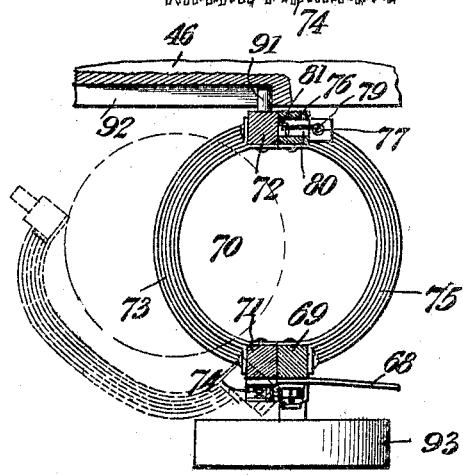
Figure 7:
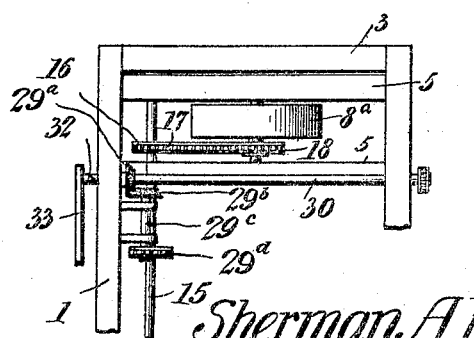
Figure 9:
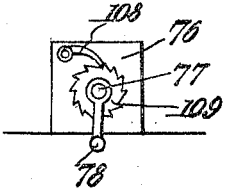

In said drawings, Figure 1 is a front elevation of a machine constructed in accordance with the principles of the invention. Fig. 2 is a top plan view of the same. Fig. 3 is a transverse vertical sectional view taken on the line 3 3 in Fig. 2. Fig. 4 is a rear elevation. Fig. 5 is a detail end view illustrating the shock-receptacle in tilted position for delivering the shock. Fig. 6 is a top plan view of the same. Fig. 7 is a detail plan view illustrating a portion of the gearing of the machine. Fig. 8 is a detail sectional elevation showing the means for operating the butt-plate. Fig. 9 is a detail view showing means for preventing backward rotation of the shaft 77.

The frame of my improved machine is composed of front and rear pieces 1 and 2, connected at their ends by cross-pieces 3 4. Near the inner end of the frame the front and rear beams are connected by cross-bars 5 5, between the front ends of which the tongue 6 is hingedly mounted on a pin 7. The main supporting-wheel $8^a$ is likewise journaled between the cross-bars 5 5 between the front and rear beams 1 2. The frame supports a pair of forwardly-diverging guide-bars or gathering-bars 8 8, the front ends of which project beyond the front frame-bar 1 and support the gathering-plates 9 9, having inclined front edges 10. Upon the upper edges of the plates 9 are mounted rearwardly-converging guide-plates 11. The plates 9 9 have bearings for shafts 12, which are disposed at right angles to the inclined faces 10 of said plates, and the lower ends of which are provided with bevel-pinions 13, meshing with bevel-gears 14 upon a shaft 15, which is journaled in suitable bearings upon the frame, said shaft being provided with a sprocket-wheel 16, receiving motion by means of a chain 17 direct from a sprocket-wheel 18 upon the shaft or axle of the transporting-wheel $8^a$. The upper ends of the shafts 12 carry sprocket-wheels 19, connected by chains 20 with sprocket-wheels 21, which are journaled upon stub-shafts 22 near the lower ends of the inclined front sides of the gathering-plates 9. The chains 20, which constitute the gathering-chains, are provided in the usual manner with laterally-extending stalk-engaging fingers 23.

The guiding-plate 11, which is supported upon the inner gathering-plate 9, is provided with guide-pulleys or sprockets 24 and with a bearing for a vertically-disposed shaft 25, carrying a sprocket-wheel 26, which latter, together with the guide-wheels 24, supports an endless chain 27, having laterally-extending stalk-engaging fingers 28. The lower end of the shaft 25 is connected by a knuckle-joint 29 with the upper end of the proximate shaft 12, whereby it is rotated.

The frame of the machine is provided with bearings for a longitudinally-disposed shaft 30, which is at right angles to the shaft 15 and which has a pinion $29^a$ meshing with a pinion $29^b$ upon a suitably-supported short shaft $29^c$, driven by chain-and-sprocket gearing $29^d$ from the shaft 15. The shaft 30 has a crank 32, which is connected by a pitman 33 with a reciprocating cutter-bar or sickle-bar 34, having teeth or cutters 35, which coöperate with the stationary cutters or knives 36 to constitute the cutting apparatus.

The frame of the machine is provided with uprights 37, supporting the upper end of an inclined frame 38, provided at its upper and lower ends with suitable bearings, in which are journaled shafts or rollers 39 40, supporting an endless carrier, which, as in the accompany drawings, may consist of a plurality of chains 41, having stalk-engaging teeth 42, or it may be of any other suitable well-known construction. The lower end of the frame of the endless carrier is in alinement with the cutting apparatus, and closely adjacent to said lower end is supported an inverted-V-shaped guard or deflector 43, which prevents stalks of corn from dropping off the outer end of the machine or from being otherwise displaced. The frame 38 is provided with a deck 44, the upper end of which is downwardly inclined, as shown at 45, to a platform 46, which supports a plurality of reciprocatory stalk-feeders 47, consisting of ratchet-bars extending through slots 48 in the inclined plane 45, the inner ends of said ratchet-bars being pivotally connected with cranks 49 upon a shaft 50, which is suitably journaled in the frame of the machine. The driven shaft 30, the carrier-supporting shaft 39, and the crank-shaft 50 are provided at their rear ends with sprocket-wheels, (designated, respectively, 51, 52, and 53,) said sprockets being connected by means of a chain 54, whereby motion is transmitted to the carrier-supporting shaft and to the crank-shaft upon the driven shaft 30, as will be readily understood. Of the reciprocating stalk-feeders 47 any desired number may be used, the preferred arrangement being such that alternate feeders will reciprocate in opposite directions, this being readily accomplished by facing alternate cranks 49 in opposite directions upon the shaft 50.

The sprocket-wheel 53 upon the crank-shaft 50 is mounted slidingly on said shaft, and it is provided with an annularly-grooved hub or collar 55, engaged by a bifurcated lever 56, which is fulcrumed to a bracket 57 upon the frame of the machine. The sprocket-wheel 53 is provided with a clutch member 58, adapted to engage a clutch member 59, which is fast upon the shaft, so that by manipulating the lever 56 the sprocket-wheel may be moved into or out of engagement with the clutch member 59. When moved out of engagement, it will rotate loosely upon the shaft 50, while when moved into engagement with the clutch member 59 the shaft will be rotated thereby. The object of this construction is to interrupt the operation of the stalk-feeders operated by the shaft 50 while the shock is being deposited upon the ground, as will be hereinafter described.

The outer end of the frame of the machine is supported upon a wheel 60, suitably journaled upon an axle connected with the outer frame-beam 4. The tongue 6 is connected by a hinged brace 61 with the frame of the machine, and said tongue is also connected, by means of a link 62, with the front end of an adjusting-lever 63, which is fulcrumed to one of the uprights of the frame of the machine, the rear end of said lever being extended within reach of the driver, whose seat 64 is supported upon a spring-bar 65, attached to the rear frame-beam of the machine. The adjusting-lever or tilting-lever 63, by means of which the frame may be tilted with relation to the tongue, as will be readily understood, upon the axes of the wheels 8 and 60, which are in longitudinal alinement with each other, may be retained in adjusted position by means of catches 66, provided for the purpose.

Hingedly connected with the front of the machine is a bracket 67, having a rearwardly-extending arm 68, with which is pivotally connected a bar 69.

70 designates a cradle or receptacle composed of side pieces 71 72 and connecting means, such as a plurality of curved bars 73, connecting said side pieces and forming the bottom of the receptacle. Said receptacle is preferably made of a rearwardly-tapering shape, as shown. The outer side piece 71 of the receptacle 70 is connected, by means of hinges 74, with the outer edge of the bar 69, which is pivotally connected with the arm 68, as herein set forth. To the bar 69 is secured a top member for the receptacle 70, which said top member may be composed of a plurality of resilient arms 75, connected at their free ends by a cleat 76. It will be observed that the member 70, including the members 71, 72, and 73, constitutes only the lower half of the receptacle or shock-receiver, the upper half of said receptacle being composed of the members 69, 75, and 76, the latter members combining to constitute what may be designated the "top" or "upper" half of the receptacle or shock-receiver. The cleat 76 supports bearings for a shaft 77, having at its rear end a crank 78, whereby it may be manipulated. Suitably connected with said shaft and capable of being wound thereon is a chain 79, which extends through a perforation 80 in the cleat and the free end of which is capable of being connected with a hook 81 upon the side piece 72 of the receptacle 70. It will be observed that by connecting the free end of the chain with this hook and then manipulating the shaft 77, so as to wind the chain thereon, the cleat 76 will be drawn down into contact with the side pieces 72, thus compressing the contents of the receptacle between the bottom of the latter and the resilient supporting means of the cleat 76.

The brace 67 is provided with bearings for a shaft 82, having a crank 83, which is pivotally connected with a butt-plate 84, the lower edge of which is also pivotally connected with a brace or rod 85, which is suitably connected with the frame of the machine. The butt-plate 84 is provided upon its rear side with a pair of blocks 86, which are adapted to extend under the front ends of the side pieces 71 and 72 of the receptacle 70, thus supporting the front end of said receptacle, which is thereby sustained in an approximately horizontal position. By manipulating the crank-shaft 82 the upper end of the butt-plate may be thrown in a forward direction, thus removing the support from under the front end of the receptacle 70, which may thus be permitted to tilt. For the purpose of operating the crank-shaft 82 the latter is provided with an arm or lever 87, connected pivotally with the front end of an operating-rod 88, which extends rearwardly to a point within reach of the driver and which is provided with notches 88$^a$, adapted to engage a pin 90, whereby it may be retained in adjusted position, as will be readily understood.

The side piece 72 of the receptacle 70 is provided with a laterally-extending pin 91, engaging a groove 92 in the proximate side of the platform 46, which supports the stalk-feeders. The groove 92 is extended to the rear end of the platform, so that the lug or pin 91 may slide rearwardly in and finally escape from engagement with said groove.

The frame-bar 69, which is pivotally connected with the arm 68 of the supporting-brace 67 and which supports the hinged end of the receptacle 70, may be sustained by means of a wheel 93, journaled upon an axle 94, attached to a bracket 94$^a$, extending downwardly from the brace-arm 68, upon which the said frame-bar 69 is disposed to swing. Additional support to the pivot may be rendered by a rod 95, depending from a bar or brace 96, which is sustained by the ends of a pair of arched brackets 97, which are suitably connected with the frame of the machine and stayed by means of guy-rods 98, as shown in Figs. 1 and 2.

From the foregoing description, taken in connection with the drawings hereto annexed, the operation and advantages of this invention will be readily understood by those skilled in the art to which it appertains. As the machine progresses over the field the stalks of corn will enter between the guides 8 and gathering-plates 9, which latter serve to pick up falling stalks which on being engaged by the fingers 23 of the guide-chains 20 will be carried in a rearward direction until they come into contact with the cutting mechanism, whereby they are severed, the fingers upon the chain 27 serving to tilt the upper end of the stalks in a rearward direction, causing the said stalks to fall upon the lower end of the endless carrier supported by the frame 38. The inverted-V-shaped shield or deflector 43 prevents displacement of the stalks and serves to guide them into engagement with the endless carrier, whereby they are elevated and deposited over the inclined plane 45 upon the table or platform 46, where they are subjected to the action of the reciprocatory stalk-feeders 47, the latter serving to push the stalks over the edge of the platform and into the stalk-receptacle 70, the stalks passing readily under the cleat, which is supported in an elevated position by the resilient members 75, which coöperate with said cleat and with the frame-bar 69 to constitute a top or closure for the stalk-receptacle. The binder-twine 99 passes from a suitably-disposed twine-can 100 across the edge of the platform 46 and is temporarily attached to a stud 101, thus placing said twine in the path of the stalks and causing the shock as it accumulates in the receptacle to be enveloped by said twine. When the receptacle is full, the free end of the chain 79 is connected with the hook member 81, and the shaft 77 is rotated by the bracket, so as to wind the chain upon said shaft, thereby forcing the cleat 76 and the top of the cradle in a downward direction, and thereby compressing the shock contained in the cradle or receptacle, means of any suitable description, such as a pawl and ratchet, (shown clearly in Fig. 9 of the drawings and designated 108 and 109,) being employed to prevent the shaft 77 from rotating in a backward direction. The machine is then stopped while the twine is tied and cut, and the operating-rod 88 is manipulated to throw the butt-plate in a forward direction, thus withdrawing the supporting-blocks 86 from under the front side of the receptacle or cradle, the front end of which will consequently gravitate in a downward direction, thus tilting the shock to a vertical position. When the machine is started up and the chain 79 is disengaged from the hook 81, the weight of the shock will cause the receptacle 70 to swing upon the hinges 74, the pin 91 becoming disengaged from the slide 92, and the shock will thus slide off the butt-plate and be left standing in the field. While this is being accomplished the sprocket 53 upon the shaft 50 is temporarily disengaged from the clutch member 59, and the stalk-feeders will thus be thrown out of operation while the shock is being discharged from the machine, thereby preventing loss or entanglement of cornstalks temporarily raised upon the table or platform 49. As soon as the shock has been discharged the cradle constituting the shock-receptacle is restored to its normal position and the machine is then ready for a repetition of the operation.

It is obvious that clutch mechanism of any approved and well-known construction may be provided for the purpose of throwing the working parts of the machine out of gear whenever for any reason it shall be desired to do so. Such mechanism is common in all machines of this class, and it has not been deemed necessary to make special illustration thereof in the present case. It will also be understood that the supporting means for the frame-bar 69 and which includes the rod 95 and the brackets 98 is to be of suitable height to preclude the possibility of interference with the shock when the latter is dumped.

Having thus described my invention, I claim—

1. In a machine of the class described, stalk-severing mechanism, stalk carrying and elevating mechanism, a platform to receive the stalks from said elevating mechanism, a cradle disposed in proximity to said platform, and means for feeding the stalks from said platform into said cradle, and means for operating the latter to discharge the contents thereof.

2. In a machine of the class described, stalk-severing mechanism, stalk carrying and elevating mechanism, a platform disposed to receive the stalks from the elevating mechanism, a cradle disposed adjacent to said platform, means for feeding the stalks from said platform into said cradle, means for operating the latter to discharge the contents thereof, and means for disconnecting said feeding means from the driving mechanism of the machine while the contents of the cradle is being discharged.

3. In a corn-harvesting machine, a frame, a pivotally-supported bar spaced from said frame, a receptacle hingedly connected at its outer side with said bar, and pivotal supporting means upon the frame for the inner side of said receptacle.

4. In a corn-harvesting machine, a frame, a pivotally-supported bar spaced from said frame, a receptacle having one edge hingedly connected with said bar and provided at its opposite edge with a pivotal pin slidably supported in a groove in the frame.

5. In a corn-harvesting machine, a frame, a bar spaced from the frame and suspended pivotally by a bracket connected with said frame, auxiliary rotary supporting means for said bar, a receptacle hingedly connected with the latter and extending between said bar and the frame, and a pin extending from said receptacle and pivotally and slidingly engaging a groove in the frame.

6. In a corn-harvesting machine, a pivotally-supported bar spaced from the frame of the machine, a receptacle hingedly connected with said bar and detachably connected with the frame of the machine, a lid including resilient members secured to the bar and connected at their free ends by a longitudinal cleat, and means for forcing said bar in the direction of the inner cleat or member of the receptacle and for detachably connecting said cleats and bars.

7. In a corn-harvesting machine, a frame, a bar spaced from said frame, rotary supporting means connected pivotally with said bar, a cradle connected hingedly with the latter and connected pivotally and detachably with the frame, and a lid including curved resilient members securely connected with the pivoted bar and means connecting the free ends of said resilient members.

8. In a corn-harvesting machine, a frame, a bracket extending from said frame, a tilting receptacle connected pivotally at one side with said bracket, means for connecting the other side of said receptacle pivotally and detachably with the frame, a hingedly-mounted butt-plate having blocks to support one end of the receptacle, and means for manipulating the free end of the butt-plate to withdraw the supporting-blocks from under the receptacle.

9. In a corn-harvesting machine, a frame, a bracket extending from said frame, a bar connected pivotally with said bracket, a cradle connected hingedly with said bar, means for connecting the free side of said cradle pivotally and detachably with the frame, resilient members connected with the pivoted bar, a cleat supported by said resilient members, and means for drawing said cleat in the direction of and securing it with relation to the pivotally-supported side of the cradle.

10. In a corn-harvesting machine, a pivotally-supported bar, a cradle hingedly connected with said bar, means for pivotally and slidably supporting the free end of the cradle, resilient members connected with the pivoted bar, a cleat supported by said resilient members, a shaft supported by said cleat, a chain connected with and adapted to be wound upon said shaft, and means for connecting said chain with the pivotally-supported side of the cradle.

11. In a corn-harvesting machine, stalk-severing mechanism, stalk-elevating mechanism, a platform to receive the stalks from the elevating mechanism, a receptacle adjacent to said platform, bracket means for pivotally supporting the side of the upper half of said receptacle distant from the platform, means for supporting the lower part of the receptacle pivotally and detachably with relation to the platform, and means for connecting the lower half hingedly with the upper half of said receptacle at the side distant from the platform.

In testimony that I claim the foregoing as my own I have hereto affixed my signature in the presence of two witnesses.

SHERMAN A. BATES.

Witnesses:
F. G. AINLEY,
D. L. RAY.